Oct. 24, 1961 R. H. FLANDERS ET AL 3,005,548
PEACH PIT FRAGMENT DETECTION MEANS AND TECHNIQUES
Filed Aug. 16, 1956 5 Sheets-Sheet 1
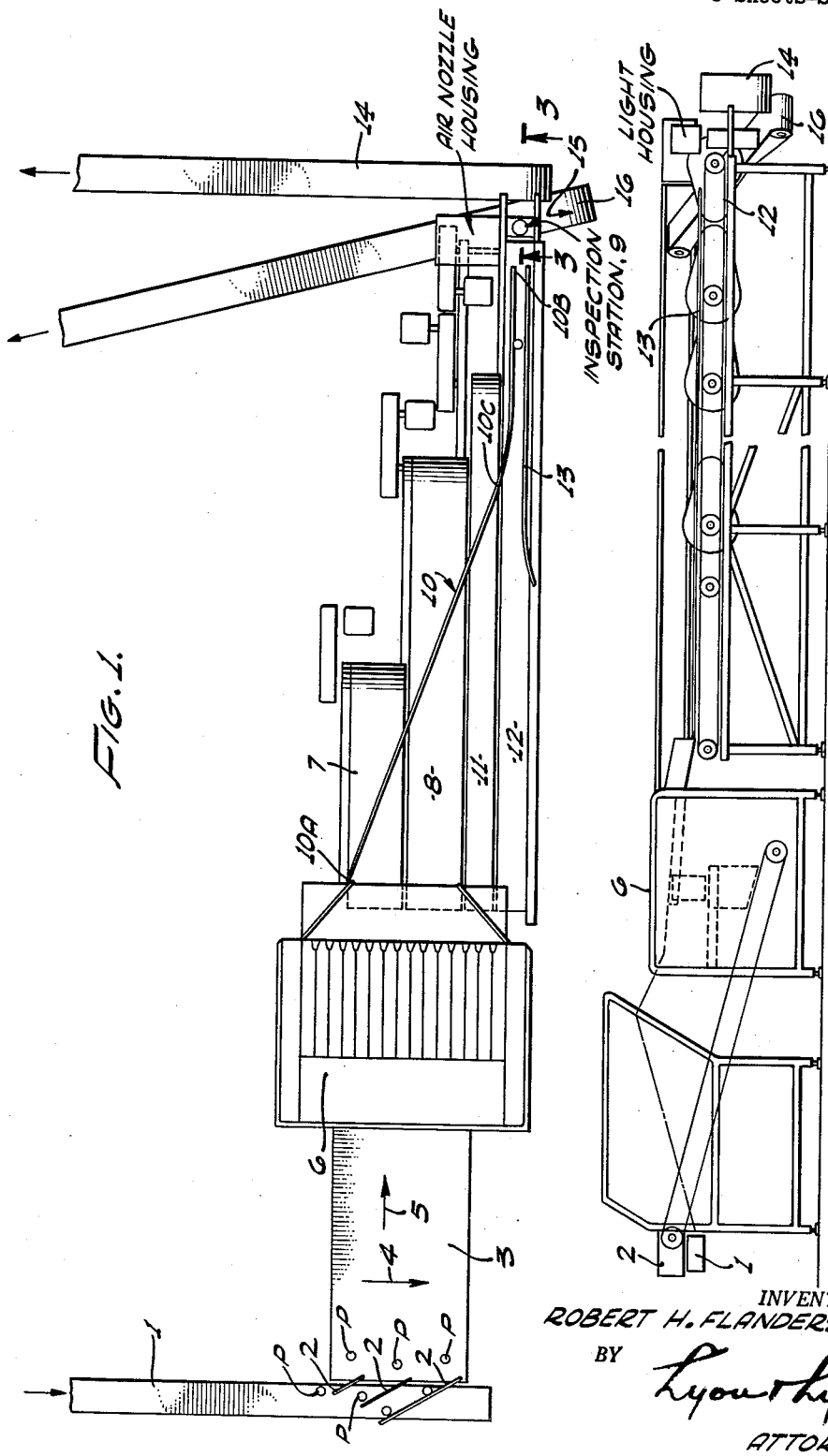
INVENTORS
ROBERT H. FLANDERS ET AL
BY
ATTORNEYS

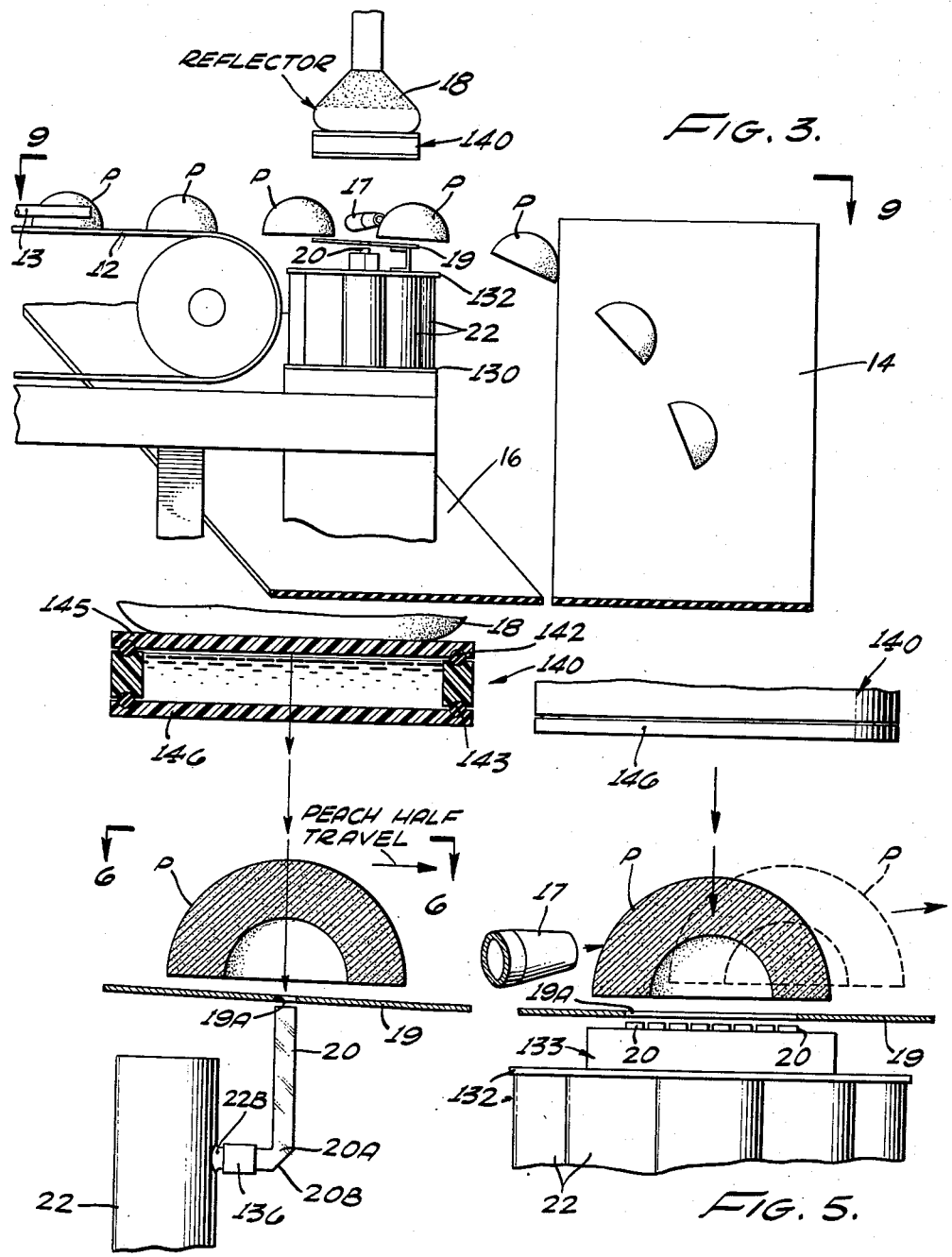

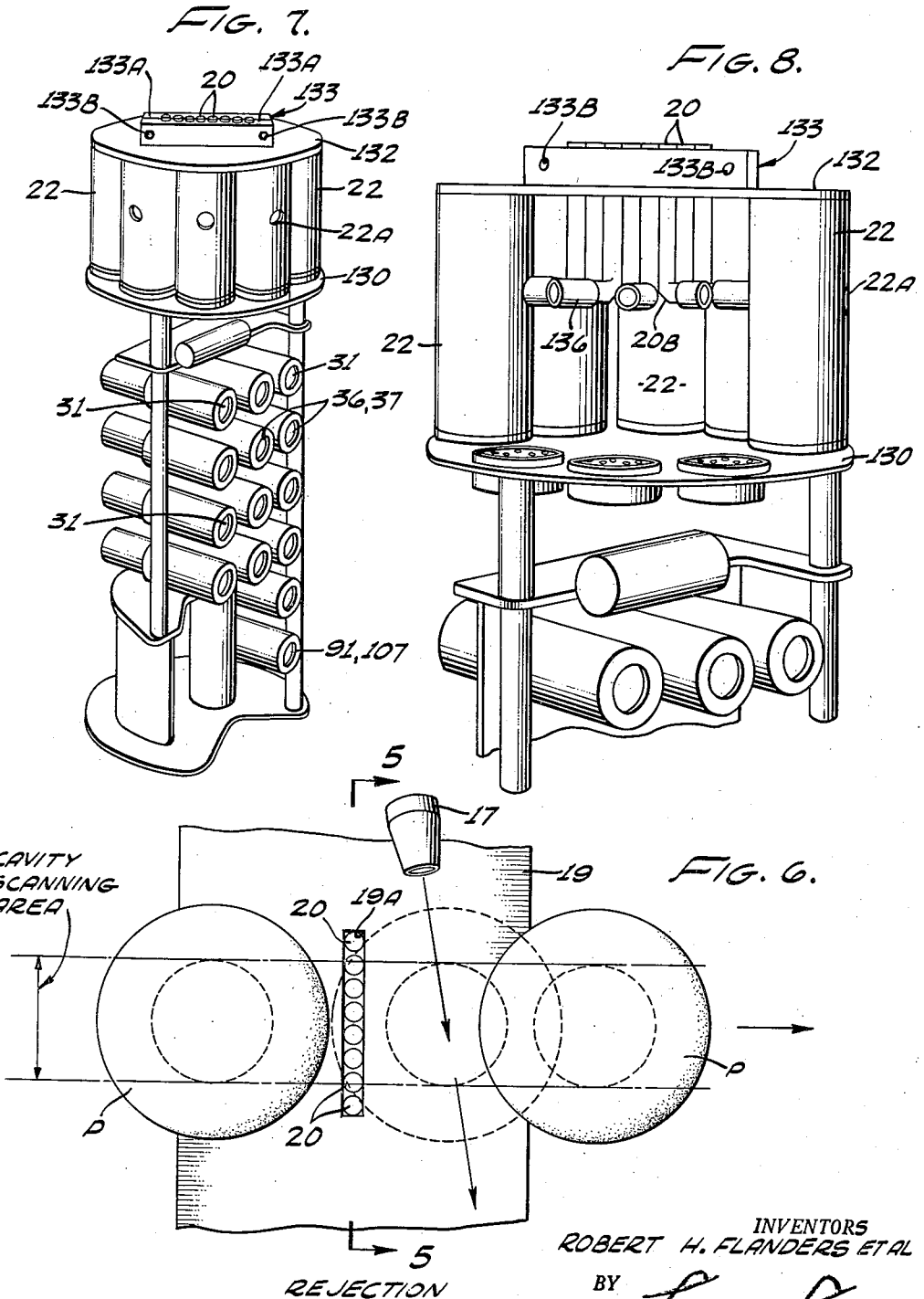

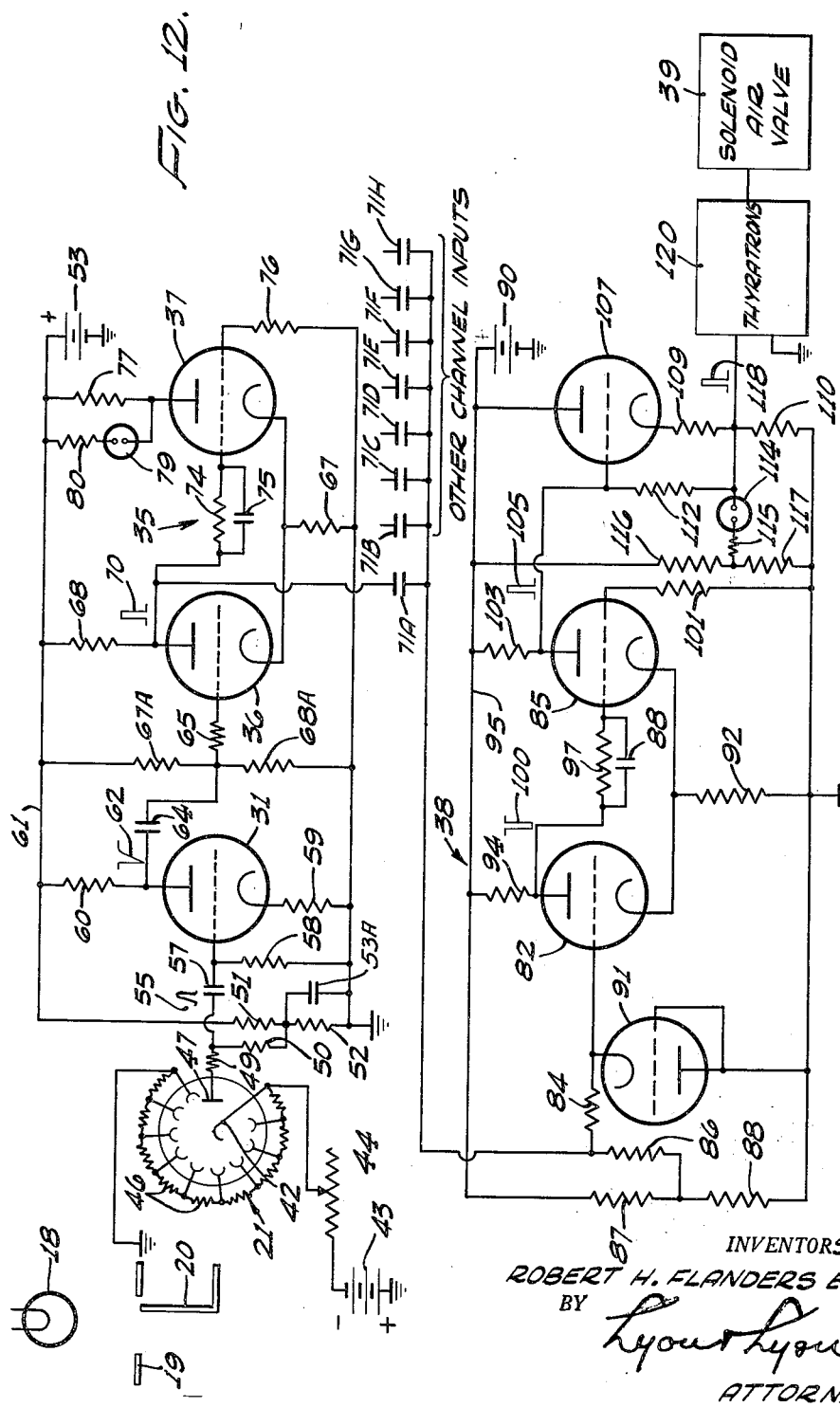

United States Patent Office 3,005,548
Patented Oct. 24, 1961

3,005,548
PEACH PIT FRAGMENT DETECTION MEANS
AND TECHNIQUES
Robert H. Flanders, Concord, and John E. Dimick, El Cerrito, Calif., assignors to California Packing Corporation, San Francisco, Calif., a corporation of New York
Filed Aug. 16, 1956, Ser. No. 604,531
1 Claim. (Cl. 209—111.5)

The present invention relates to improved means and techniques for detecting the presence of a peach pit or fragments thereof in a peach half and for classifying the peach halves accordingly, and is in the nature of an improvement in the invention described and claimed in the co-pending application of Flanders et al., Serial No. 604,-558, filed on even date herewith.

In peach canneries the peaches are usually cut in half by a saw, and the split peach pit is removed by a pitter, after which the peach halves are conveyed past inspection stations, at which peach halves are inspected for blemishes, discoloration, peach pits and fractions thereof prior to canning. Such inspection and removal of undesired peach halves, peach pits and fragments thereof are carried out manually as a result of visual observation.

The operation of the peach pitter, while satisfactory, is not 100% perfect, and as a result many of the peach halves still retain a peach pit half or a smaller fragment of a peach pit. This necessitates the employment of many inspectors, as indicated above, who visually inspect the peach halves for attached peach pit fragments.

The present arrangement serves to inspect each peach half, using radiation responsive means such as photoelectric means to develop a suitable control voltage when the peach half has attached thereto a peach fragment, and to use such control voltage to separate those peach halves having pit fragments attached thereto. The rate of inspection is indeed fast, amounting to approximately fifty peach halves per second.

It is, therefore, a general object of the present invention to provide improved means and techniques for detecting the presence of peach pit fragments and to effect a classification of the peach halves according to whether or not a particular peach half has attached thereto a pit fragment or is free of any fragments.

A specific object of the present invention is to provide improved means and techniques of this character working on the principle of light transmission through the peach half.

Another specific object of the present invention is to provide improved means and techniques for classifying comestibles according to their translucency.

Another object of the present invention is to provide improved means and techniques of this character which are capable of effecting such classification at a high practical rate in the order of fifty per second.

Another specific object of the present invention is to provide improved means and techniques of this character involving the inspection of a comestible while in free flight, travelling at relatively high speeds corresponding to, for example, an inspection speed of fifty peach halves per second.

Another specific object of the present invention is to provide improved means and techniques which function to effect a classification of peach halves according to their translucency, notwithstanding the fact that a peach half inherently allows greatest radiation transmission therethrough in the direction of its fibres, and notwithstanding the fact that inspection is carried out with the peach half that inherently has a cup-shaped portion.

Another specific object of the present invention is to provide improved means and techniques for the purposes indicated that involve a special form of optical system for achieving the desired results.

Another specific object of the present invention is to provide improved means and techniques involving radiation responsive means controlling selecting means such that the radiation detection means does not effect operation of the selecting means when either there is no peach half in the inspection zone or when a peach half, free of a fragment, is in the inspection zone.

Another specific object of the present invention is to provide improved means and techniques for developing electrical pulses in response to peach halves having pit fragments attached thereto, and using such pulses to effect a classification.

A specific object of the present invention is to provide an improved optical system for the above purposes involving a plurality of light collimating means and associated radiation responsive means for more accurately determining the presence of peach half pit fragments.

Another specific object of the present invention is to provide an improved arrangement of this type which allows more accurate determinations of pit fragments, particularly in that it is not critical as to any specific position or orientation of the peach half while at the inspection station, or to peach half size.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings, in which:

FIGURE 1 is a top plan view of apparatus embodying features of the present invention.

FIGURE 2 is a view in side elevation of the apparatus shown in FIGURE 1.

FIGURE 3 is a view taken generally on the line 3—3 of FIGURE 1.

FIGURE 4 is a sectional view illustrating the relationship between a peach half and the masking means and photocell, also illustrated in FIGURE 3.

FIGURE 5 is a view taken generally in the direction indicated by the lines 5—5 in FIGURE 6, but with the peach half displaced.

FIGURE 6 is a view taken in the direction indicated by the arrows 6—6 in FIGURE 4, but with the peach half displaced.

FIGURES 7 and 8 are perspective views illustrating constructional features of a portion of the optical system and related photocell and tube mountings.

FIGURE 12 illustrates electrical circuitry connected to the photocell or radiation responsive means illustrated in connection with the previous figures.

Figure 9:
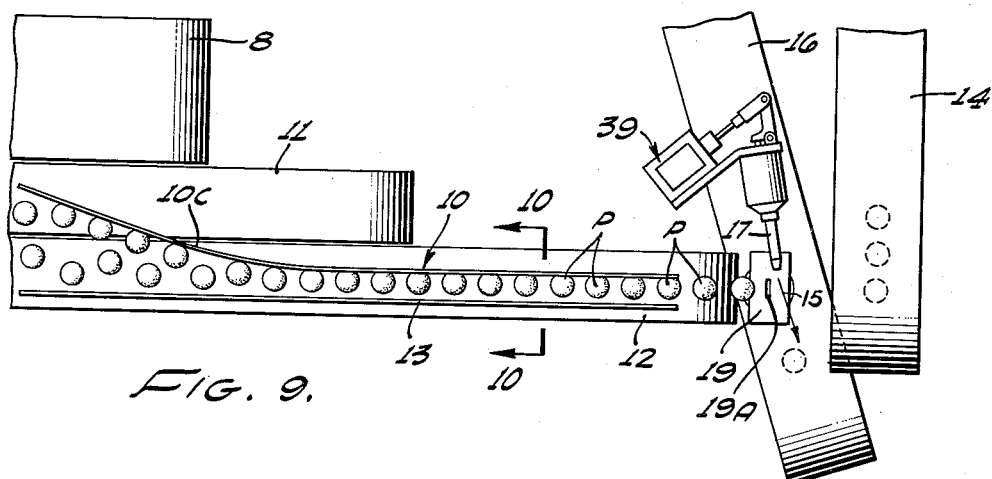
FIGURE 9 is a view taken generally in the direction indicated by the arrows 9—9 in FIGURE 3.
Figure 10:
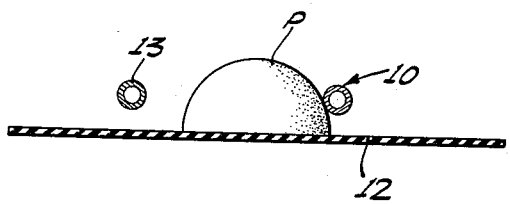
FIGURE 10 is a view along line 10—10 of FIGURE 9.
Figure 11:
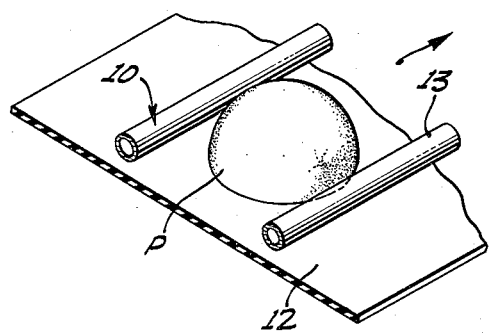
FIGURE 11 is a perspective view of the elements shown in FIGURE 9.

The present arrangement presupposes that peaches are cut or sawed in half by a conventional peach pitter which serves also to remove the cut peach pits and also fragments of the halved peach pits from most of the peach halves, while at the same time failing to properly remove the halved pits or fragments thereof from the other peach halves, as is usually the case in canneries functioning to can peach halves. Also, it is presupposed that the peach halves are unpeeled and are wet.

Thus, the halved wetted peach halves P (some with peach pits, halved pits or fragments thereof still clinging to the peach half and the other peach halves free thereof)

are loaded onto conveyor belt 1 from which they are deflected by deflecting plates 2 onto the so-called walking beam conveyor 3, which is reciprocated generally in the direction indicated by the arrows 4, so as to seek a uniform distribution of the peach halves P laterally of the conveyor 3, while at the same time the peach halves are being moved generally in the longitudinal direction of the belt 3, as indicated by the arrow 5. The peach halves leave the conveyor 3 and gravitate onto a so-called "cup down shaker" 6 which functions to convey the peach halves onto a plurality of conveyor belts 7 and 8 in cup down relation, and which may be a conventional form of apparatus adapted slightly for this intended purpose. The term "cup down" means that the flat side of the peach half rests on a conveyor with the convex side of the peach half facing upwardly.

All of the peach halves are transported in single file past the inspection station 9, preferably with a space between adjacent peach halves. For this purpose a peach half deflecting means, in the form of a circular tubular element 10, extending at an acute angle with respect to the movement of conveyor belts 7, 8, 11 and 12, is contacted by the peach halves so as to direct them in single file order towards the inspection station 9.

The tubular guide rail 10 extends generally from the point 10A to the point 10B and is straight between the points 10A and 10C, but has a curved portion between the points 10C and 10B. This tubular guide rail 10 thus directs the peach halves onto the belt 12.

The belts 7, 8, 11 and 12, while travelling at a constant speed, have different speeds. The belts 7, 8, 11 and 12 travel, respectively, at the rate of approximately 75 inches, 80 inches, 125 inches and 150 inches per second. The purpose of running these belts at different speeds is to achieve the desired separation between adjacent peach halves as they travel in single file order past or through the inspection station 9. The guide rail 10 comprises a circular rod or tube spaced about one-half of an inch above the upper surface of the belts 7, 8, 11 and 12.

A second rail 13 of the same size as rail 10 is spaced from the rail 10 to confine those particular peach halves which do not tend to be guided by the rail 10, although most of the peach halves continue in their movement while in rubbing engagement wtih the guide rail 10.

The belt 12, upon which all of the peach halves ultimately move in single file with a desired spacing between the same, terminates a slight distance before the inspection station 9, as clearly shown in FIGURE 3. This means that the peach halves, due to their acquired momentum, are projected in free flight when and as they leave the belt 12 and travel past or through the inspection station 9, at which they are inspected for whole pits, halved pits or smaller fragments thereof.

Those peach halves which are free of any whole pits, halved pits or fragments thereof continue their movement in generally a straight line and are collected on the conveyor belt 14, while those peach halves containing whole pits, halved pits or fragments thereof are deflected by a controlled air stream or blast in the general direction indicated by arrow 15 FIGURE 9 on the endless conveyor belt 16, all in accordance with signals derived from sensing means located at the inspection station 9.

The particular means used for deflecting or rejecting the peach halves in the direction indicated by the arrow 15 includes a solenoid operated type of air valve 39, FIGURE 9, for projecting a blast of air through nozzle 17 onto the peach half while it is still in free flight.

The sensing means used for developing a voltage for operating the air valve involves generally a source of radiation 18, preferably one which emits radiation predominately in the blue portions of the spectrum, for transmitting radiation through a peach half and radiation masking means 19, in the form of a slit, and onto a plurality of collimator rods 20, eight in number, which serve to direct radiation to radiation responsive devices 21 (FIGURE 12, and contained in individual light tight housings 22), such as for example a corresponding photocell, the devices 21 being predominantly responsive to radiation in the blue regions of the spectrum, and insensitive to radiation in the red end of the spectrum, although it is understood, of course, that satisfactory operation is obtainable when radiation in other portions of the visible spectrum is used, provided that tubes sensitive to such portions of the spectrum are used. As a matter of fact, satisfactory operation is obtained when the illuminating source 18 is a conventional lamp used generally as a floodlamp or spotlamp, and when correspondingly the photocells 21 are of the 931A type of photomultiplier tube.

The radiation masking means 19 is simply a metal plate having a slot or slit portion 19A within the confines of which the upper ends of the collimator rods 20 are disposed, as shown in FIGURE 5. Such slit is generally rectangular, having dimensions ¼ inch by 2 inches, with the longitudinal axis of the slit extending perpendicularly to the direction of peach half movement, as indicated in FIGURE 6.

The general purpose of the masking means in each form shown in FIGURES 5, 6 and 7 is to allow "observation" by the radiation responsive means 21 of only portions of the concave pit cavity in the peach half, in certain positions of the peach half during its travel. In other words, the radiation responsive means 30 is allowed to "see" only a portion of the pit cavity so as to allow concentrated inspection of the same for any pit fragment still clinging in the peach half cavity, whereby rejection is accomplished when the pit fragment is small in relation to the pit cavity as now explained.

The diameter of the average pit cavity is for the present purpose considered to be 1½ inch, and the longest dimension of the slit is larger than this dimension, namely, 2 inches. The peach halves need not necessarily be graded for size before being subjected to the inspection apparatus. With ungraded fruit, i.e., peach halves, the apparatus is capable of detecting pit fragments as small as one-third or one-quarter of original pit size, and this performance may be improved when the fruit is originally graded as to size, in which case this ratio is reduced to one-sixth or one-eighth pit size.

Special problems are encountered in sensing pit fragments in peach halves using transmitted light due to the particular cross-sectional shape of the peach half and its light transmission characteristics, as well as the fact that the surface of the peach half is wetted and differs in degree of ripeness.

The detection method involves essentially the use of transmitted light to effect a contrast between, on the one hand, a peach half free of fragments, and, on the other hand, a peach half having a small pit fragment. Such contrast is achieved using to advantage the light transmission characteristics of a peach half indicated above. Since the fibres extend radially inwardly toward the cavity and radiation attenuation is less in that direction, the cavity appears lighter when viewed with transmitted light than the area surrounding the cavity which appears darker than the cavity, in a degree depending upon the distance from the cavity, the darkness being more pronounced immediately adjacent the region which defines the cavity and degrades into lighter portions in accordance with distance from such region; and the peripheral edge appears light largely because the path length directly through the peach half is a minimum near the peripheral edge.

It is considered desirable that the source of radiation uniformly illuminate the peach half. Preferably, the peach half, while being inspected by such transmitted light, is spaced approximately 3/16 inch above the masking plate 19, or closer, although it has been found that on peaches which are excessively less translucent (green peaches), a greater distance may be desirable.

For high speed operation, the air nozzle 17 in FIGURE 3 is oriented to project a blast of air that lifts a rejected peach half and to extend in the direction of peach half travel at an angle of approximately ten degrees with respect to a line which is perpendicular to undeflected peach travel.

The electrical circuitry involves a plurality of photocells 21 (FIGURE 12) receiving transmitted light through a slit system. Each photocell 21 is electrically associated with an amplifying stage 31 and a pulse shaping circuit 35 involving tubes 36, 37, a mixing circuit (condensers 71A through 71H), a mixed pulse shaper circuit 38 involving tubes 82 and 85, cathode follower output circuit involving tube 107, thyratron control circuit 120 and the solenoid operated air valve 39.

A series of such photomultiplier type tubes for photocells 21 are so arranged that each tube views a small adjacent area extending across the general region of the peach half cavity. As the peach half travels over the eight collimators 20, a series of adjacent parallel paths, overlapping to a degree, are scanned in the direction of peach half travel. The phototube sensitivity and light travel are so adjusted that the photocells are saturated until a peach half with a pit fragment attached thereto brings one or more of such photocells out of its normal saturated condition. In such case a positive going signal across the load resistance of the corresponding photocell or photocells, as the case may be, is amplified, shaped and mixed with corresponding signals which may be simultaneously developed in other channels; and then such signal or signals, as the case may be, is used to fire the thyratron for purposes of energizing the solenoid operated air valve 39.

Figure 13:
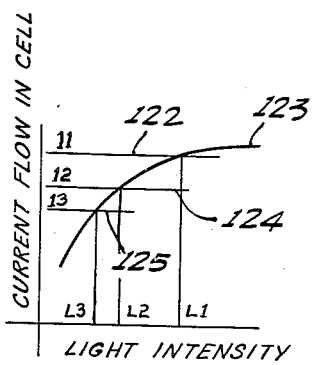
FIGURE 13 illustrates graphically the response characteristic of the photocell shown in the previous figures.

Each photocell 21, of the photomultiplier type, has its cathode 42 connected to the ungrounded negative terminal of a source 43 through a corresponding adjustable resistance 44. The series of dynodes are connected to spaced points in conventional manner on a voltage dropping resistance 46 having one of its outside terminals connected to the cathode 42 and the other one of its outside terminals grounded. The anode 47 is connected through resistances 49 and 50 to the junction point of resistances 51 and 52, the resistances 51 and 52 being serially connected with the source 53 to provide a voltage dividing circuit and a condenser 53A shunts resistance 52. The resistance 49 serves generally as a regulating or current limiting resistance and resistance 50 generally as a load resistance for the photocell 21 which, in the absence of a peach half or when a peach half without a pit passes over, is in a saturated condition, as indicated in FIGURE 13. When the light intensity normally falling on the photocell 21 is reduced, its resistance is increased, with the result that the voltage on anode 47 is increased. This increase in voltage manifests itself as a positive pulse, as indicated by the positive pulse 55, due to movement of the peach half. This positive pulse 55 developed on the anode 47 is applied to the control grid of tube 31 through the resistance 49 and coupling condenser 57, such control grid being returned to ground through resistance 58. The cathode of tube 31 is returned to ground through resistance 59 and the anode of tube 31 is connected through its load resistance 60 to the positive lead 61, connected to the positive ungrounded terminal of source 53. The resulting negative pulse 62 appearing on the anode of tube 31 is applied through coupling condenser 64 and resistance 65 to the control grid of tube 36. The junction point of condenser 64 and resistance 65 corresponds to the junction point of resistances 67A and 68A which are serially connected with source 53 to provide a voltage dividing circuit.

The cathode of tubes 36 and 37 are returned to ground through a common cathode resistance 67. The anode of tube 36 is connected through resistance 68 to the positive lead 61 and a sharpened or shaped positive pulse 70 is developed on the anode of tube 36, due to joint functioning of tube 36 with tube 37. It is noted that this shaper circuit 36, 37 is pulse selective in that it is not operated unless a signal above a predetermined amplitude is applied thereto. This positive pulse 70 is applied through one of the series of eight coupling condensers 71A, 71B, 71C, 71D, 71E, 71F, 71G and 71H (corresponding respectively to so-called channels A, B, C, D, E, F, G and H) to the mixed pulse shaping circuit 38. A purpose of circuit 38 is to obtain a pulse 105 of the same amplitude regardless of the number of channels that are operated. The pulse 105 may, under different operating conditions, vary in duration, depending on the number of channels operated and the timing thereof, but remains substantially constant in amplitude.

For selectivity and pulse shaping purposes, the anode of tube 36 is connected through the parallel connected resistance 74 and condenser 75 to the control grid of tube 37 which is returned to ground by resistance 76. The anode of tube 37 is connected to the positive lead 61 through resistance 77 which has connected in shunt thereto an indicating neon lamp 79 and associated resistance 80.

More specifically, the pulse 70 developed on the anode of tube 36 is applied to the control grid of tube 82 through the coupling condenser 71A and resistance 84. The tube 82 operates in conjunction with the other associated tube 85 for pulse shaping or sharpening purposes, the tubes 82 and 85 being interconnected in a similar manner as the tubes 36 and 37. The control grid of tube 82 is connected through resistances 84 and 86 to the junction point of resistances 87 and 88, the resistances 87 and 88 being serially connected with source 90 to provide a voltage dividing circuit.

A clamp tube 91, i.e. diode, has its cathode connected to control grid of tube 82 and has its anode and control grid connected jointly to ground.

The cathodes of tubes 82 and 85 are returned to ground through a common cathode resistance 92. The anode of tube 82 is connected through its load resistance 94 to the positive lead 95, connected to the ungrounded positive terminal of source 90. The anode of tube 82 is connected to the control grid of tube 85 through the parallel connected resistance 97 and condenser 98, so that the negative pulse 100 developed on the anode of tube 82 is applied to the control grid of tube 85, such control grid being returned to ground through resistance 101. The anode of tube 85 is connected through its load resistance 103 to the positive lead 95. The resulting positive pulse 105 developed on the anode of tube 85 is applied to the control grid of the cathode follower tube 107, having its anode connected to the positive lead 95 and its cathode returned to ground through the serially connected resistances 109 and 110. The control grid of tube 107 is connected through resistance 112 to the junction point of resistances 109 and 110. This junction point is also connected through the neon indicating lamp 114 and associated resistance 115 to the junction point of resistances 116 and 117, the resistances 116 and 117 being serially connected with source 90 to provide a voltage dividing circuit. The positive pulse 118 thus developed across the resistance 110 is well above a predetermined thyratron threshold value, and is applied to a stage 120 of said thyratron tubes for developing sufficient output to operate the solenoid air valve 39. It is noted that the indicating neon lamp 79, individual to each channel, serves to indicate, by its illumination, the presence of a pit fragment in that particular channel, while the neon indicating lamp 114, by its illumination, serves to indicate the fact that one or more of the eight channels is or are, as the case may be, developing pulses of sufficient intensity to cause operation of the air valve 39.

When the thyratron control is thus fired, the air valve 39 is opened to release a stream of air for deflecting the peach half that caused the original pulse 55.

For these purposes each one of the cells 21 is normally operated in close to what may be termed a saturated condition when no peach half or a peach half without a pit is positioned between the radiation source and the cell 21. In such case the cell 21 is subjected to maximum light intensity, its resistance is lowest and the resistances 49 and 50 serve to limit the flow of current through the cell. This latter condition is indicated in the graph in FIGURE 13 which shows light intensity as the abscissae and resulting current flow in cell 21 as ordinates. The horizontal line 122 associated with such graph 123 represents the condition when no peach half or when a peach half without a pit is present. The horizontal line 124 represents the condition when a peach half without a pit fragment, i.e. an acceptable peach half, is positioned between the source and cell. This corresponds to a condition wherein the light intensity in FIGURE 13 may be represented by the abscissa L1 and the corresponding current flow by the ordinate I1.

It is noted that an acceptable peach half will produce only a change in current to a value I2 corresponding to a light intensity of L2 and will not produce the pulse 55 (FIGURE 12), but the pulse which is produced is of very low amplitude and, in such case, there is, of course, no pulse 118. When a peach half having a pit fragment produces the condition indicated by the line 125, wherein, as represented in FIGURE 13, the current is now I3 and the corresponding light intensity is now L3, the pulse applied to the shaper circuit 36, 37 is of sufficient amplitude to produce pulse 118 which fires the thyratron circuit 120 to produce a resulting deflection of such peach half having a pit fragment. It will be observed from the shape of the saturation curve in FIGURE 13 that its slope between L1 and L2 is smaller than between L2 and L3 which means that an incremental change in light intensity between L2 and L3 produces a greater change in current than the same incremental change in light intensity in the region between L1 and L2. This means that the photocell is more sensitive to changes in light intensity in the region L2 and L3, i.e. in the region wherein pit fragments are being detected.

The eight photocells are mounted within corresponding light tight shield cans 22 (FIGURES 3, 7 and 8) on a generally circular frame or rack 130. Each can 22 may be provided with an apertured portion 22A aligned with the cathode of the photocell contained therein for inspection and test purposes. The frame 130, in turn, is enclosed in a cylindrical light tight housing (not shown) which is closed at its top by the circular plate 132 having mounted thereon the generally rectangular collimator tube, clamp, support or spacer 133. This support 133 may be provided with eight closely spaced bore holes which snugly receive the collimator tubes 20 of plastic, such as, for example, Lucite or other similar material.

Each one of these tubes 20, as shown in FIGURE 4, has a ninety degree bend 20A for directing radiation onto a photocell 21 in shield can 22, the light or collimator tubes being supported on the shield can by a collar, sleeve or bushing 136 that engages both the collimator tube housing 22B and the lower bent end of collimator tube 20.

Each collimator tube preferably is formed with a flat 45 degree reflecting surface 20B at the bend 20A, and such reflecting surface is preferably polished for enhancing and confining the transmission of radiation through the collimator tube. Also, preferably the entire outer surface, except for the flat 45 degree surface, is painted with a black paint for the same purpose.

Preferably for ease of assembly and replacement, the element 133 is in the nature of a two-piece clamp with the element 133 being split longitudinally, as indicated by the lines 133A in FIGURE 7. The two split portions are held together by, for example, screws 133B.

The other tubes illustrated in FIGURE 12 are mounted on the frame or rack 130, as shown in FIGURES 7 and 8.

Preferably the radiation source 18, as shown in FIGURES 3 and 4, has an optically transparent water jacket 140 associated therewith, as illustrated, to protect the Lucite collimator tubes 20 from excessive heat developed in the projection or floodlight type of lamp 18 having a nominal rating of 150 watts. Full rated voltage is applied to lamp 18.

The transparent water jacket 140 is fabricated from heat resistant material such as Pyrex glass with suitably disposed O type rings 142, 143 serving as gaskets to prevent water leakage. The upper glass plate or disc 145 abuts the glass envelope of the lamp 18 and is spaced from the lower plate or disc 146 by approximately one-half of one inch. The lower plate or disc 146 is spaced from the masking plate 19 by approximately three and one-half inches to thus project a spot of light on plate 19 of approximately 4½″ diameter. Some of the heat developed by the lamp is beneficial in that it has the effect of evaporating moisture which may come from the wetted peach half in its free flight or from accumulated moisture on the belt 12.

The diameter of the Lucite rods 20 are approximately one-quarter of one inch, and the slit in the mask 19 is approximately two inches by one-quarter of an inch, so that the photocells, considered collectively, view the cavity portion of a peach half and a small surrounding area, considering the fact that the average diameter of a cavity portion is approximately one and one-half inches.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

We claim:

In an arrangement of the character described for separating peach halves having pit fragments, an inspection station including a radiation source for illuminating an entire peach half and a plurality of radiation detection means spaced from said source and defining a path therebetween through which said peach halves are moved, each of said radiation detection means including a separate collimator tube with a collimator tube of one of said detection means being aligned in a straight line with a collimator tube of another one of said detection means to define a linear array of collimator tubes, means for projecting said peach halves through said path with said peach halves being in horizontal free flight and with the convex portions of said peach halves facing said source and with the cup-shaped portions of said peach halves facing said linear array of collimator tubes, each one of said detection means being sensitive to the radiation transmitted through a different portion of said peach halves and through a corresponding one of said array of collimator tubes, a single peach half deflection means, means coupled to and operated by said detection means for operating said single deflection means when a pit fragment changes the radiation impinging on any one of said collimator tubes, radiation masking means interposed between said peach half and said radiation detection means for limiting the radiation impinging on each of said detection means after transmission through said peach half, said masking means comprising an elongated slit having its longitudinal axis extending perpendicular to the direction of peach half movement, said array of collimator tubes being in close proximity to said slit and having an area for light transmission substantially equal to the area of said slit to receive substantially all of the radiation passing through said slit.

(References on following page)

References Cited in the file of this patent

UNITED STATES PATENTS

| | | |
|---|---|---|
| 1,943,278 | Thompson et al. | Jan. 9, 1934 |
| 2,132,447 | Stout | Oct. 11, 1938 |
| 2,190,563 | Horsfield | Feb. 13, 1940 |
| 2,205,397 | Drake | June 25, 1940 |
| 2,286,737 | Hills | June 16, 1942 |
| 2,532,644 | Robinson | Dec. 5, 1950 |
| 2,562,960 | Stern | Aug. 7, 1951 |
| 2,668,877 | Gent et al. | Feb. 9, 1954 |
| 2,669,354 | Perrin | Feb. 16, 1954 |
| 2,693,734 | Coleman | Nov. 9, 1954 |
| 2,696,297 | Matthews | Dec. 7, 1954 |
| 2,803,754 | Cox | Aug. 20, 1957 |
| 2,881,919 | Bartlett | April 14, 1959 |

FOREIGN PATENTS

| | | |
|---|---|---|
| 504,683 | Great Britain | Apr. 28, 1939 |